United States Patent [19]
Vandenhoek

[11] Patent Number: 5,143,413
[45] Date of Patent: Sep. 1, 1992

[54] GATE BRACKET CONNECTOR WITH A PAIR OF U-SHAPED YOKE MEMBERS

[76] Inventor: Vernon Vandenhoek, Lynnville, Iowa 50153

[21] Appl. No.: 705,580

[22] Filed: May 24, 1991

[51] Int. Cl.⁵ ............................ F16B 7/00; F05C 3/04
[52] U.S. Cl. ................................ 292/302; 292/205; 292/DIG. 60; 403/400; 403/385
[58] Field of Search .............. 403/385, 400; 292/213, 292/302, 205, DIG. 13, DIG. 60

[56] References Cited

U.S. PATENT DOCUMENTS

| | | |
|---|---|---|
| 404,391 | 6/1889 | Dyer . |
| 3,698,752 | 10/1972 | Edwards .............................. 292/205 |
| 3,747,967 | 7/1973 | Edwards ........................ 297/341.19 |
| 3,857,593 | 12/1974 | Lening ...................................... 292/5 |
| 3,907,345 | 9/1975 | Martini ....................... 292/DIG. 13 |
| 4,142,703 | 3/1979 | Moretto ............................... 403/400 |
| 4,355,922 | 10/1982 | Sato ...................................... 403/400 |
| 4,566,819 | 1/1986 | Johnston ............................. 403/385 |
| 4,618,175 | 10/1986 | Smith .................................... 292/205 |
| 4,632,221 | 5/1986 | Stanford .............................. 403/385 |
| 4,790,578 | 12/1988 | Barrers ................................... 292/57 |
| 5,017,038 | 5/1991 | Kŭrosaki ............................. 403/400 |
| 1,7606,215 | 3/1926 | Davidson ............................ 403/385 |

FOREIGN PATENT DOCUMENTS

| | | | |
|---|---|---|---|
| 412493 | 12/1945 | Italy ..................................... 403/385 |
| 383451 | 11/1932 | United Kingdom ................ 403/385 |

Primary Examiner—Eric K. Nicholson
Attorney, Agent, or Firm—Zarley, McKee, Thomte, Voorhees & Sease

[57] ABSTRACT

A universal connector is provided which is especially well suited for connecting the free ends of gates of a double gate. The connector includes a yoke rotatably attached to a base portion which may be a flat plate for attachment to a post by bolts or the flat plate may be bent into a second yoke wherein the two yokes are rotatably connected in a back to back relationship for interconnecting a pair of items such as the free ends of gates in a double gate.

6 Claims, 2 Drawing Sheets

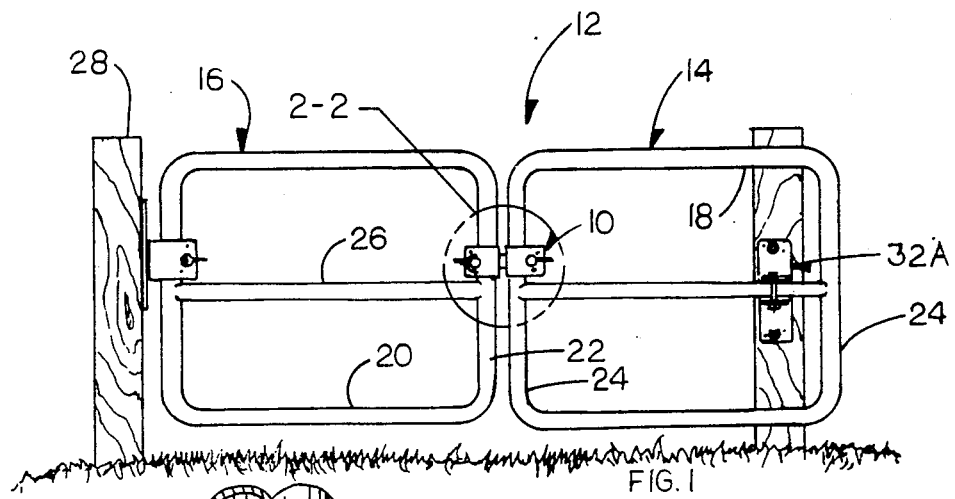
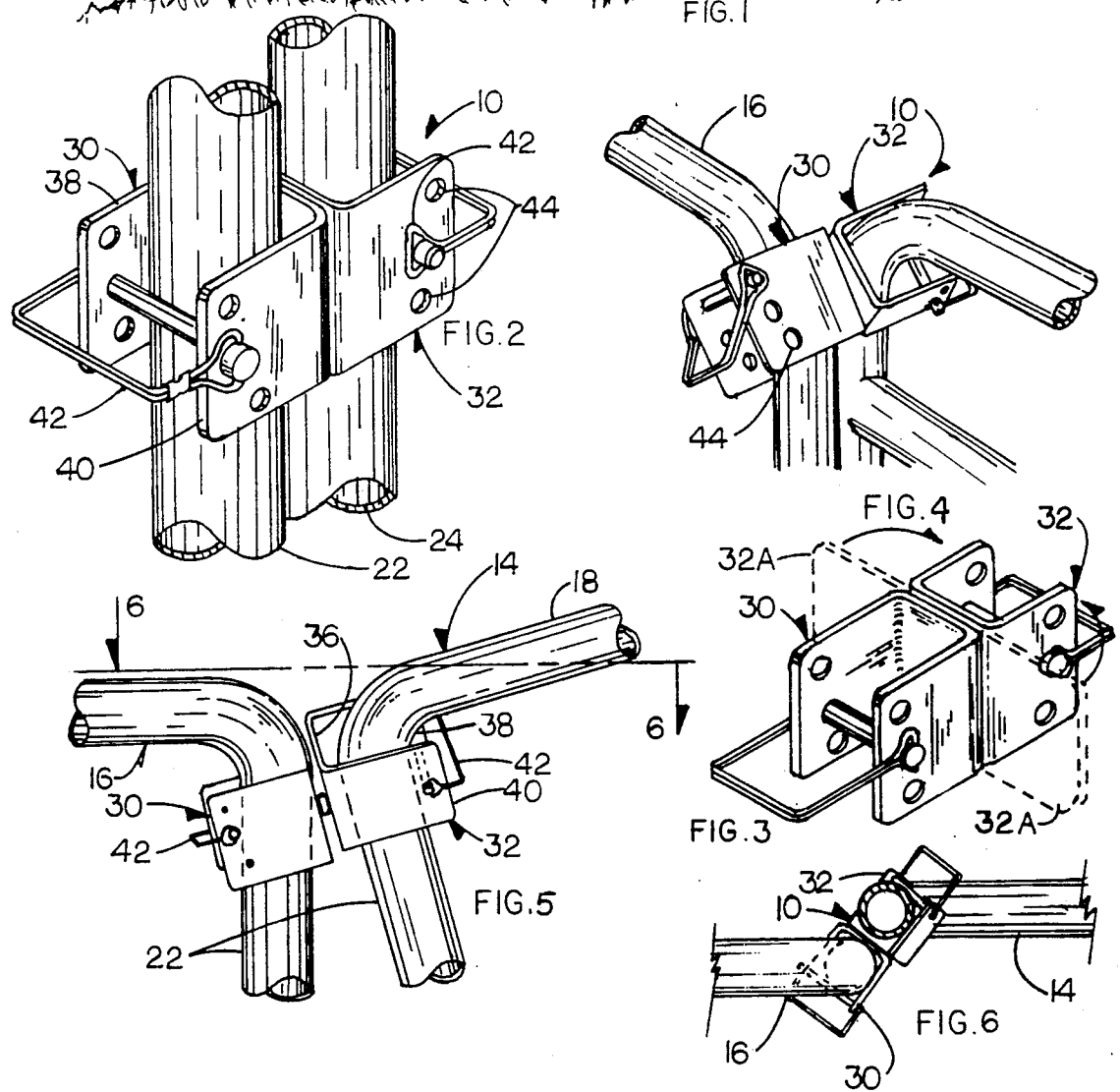

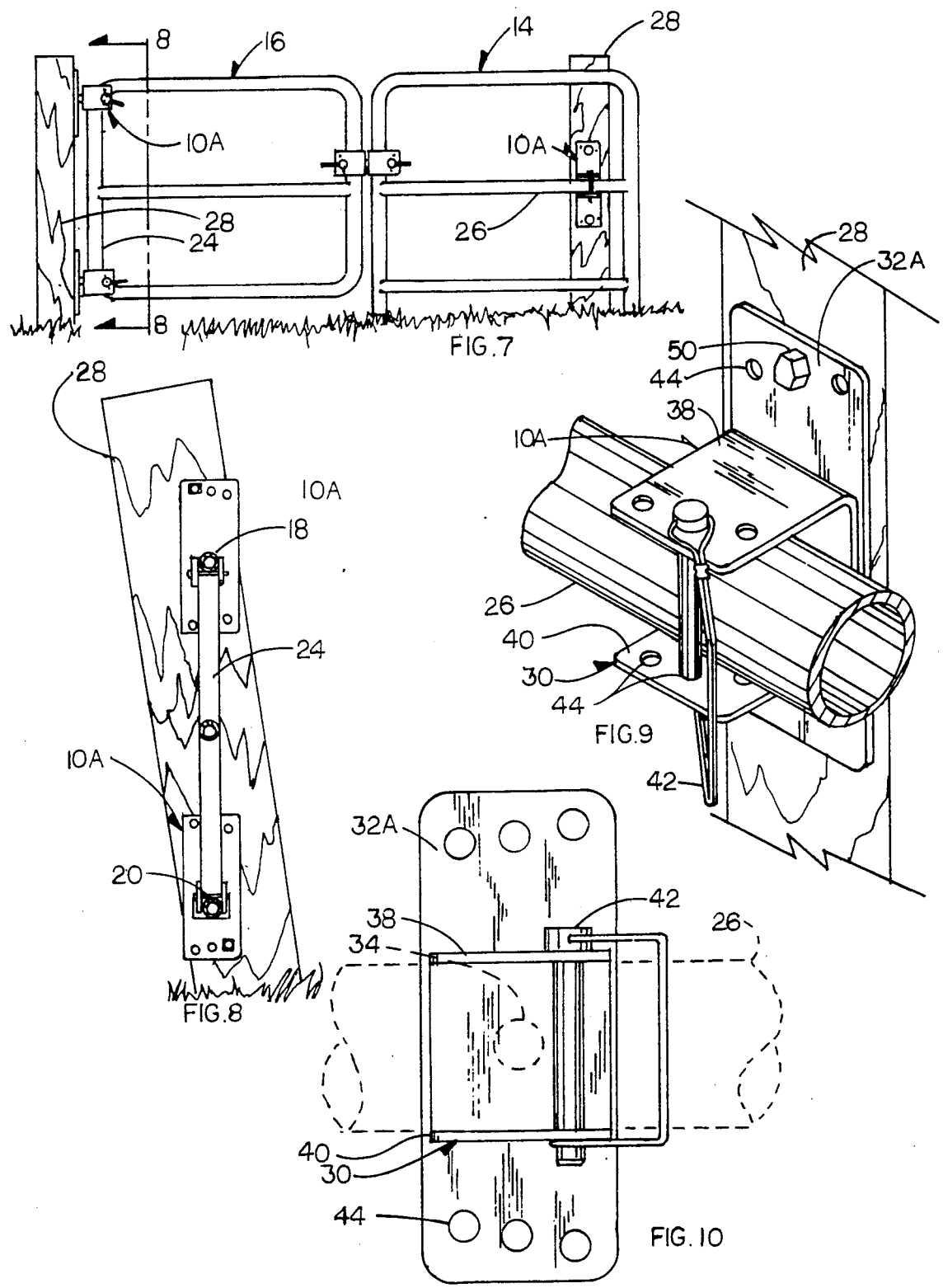

GATE BRACKET CONNECTOR WITH A PAIR OF U-SHAPED YOKE MEMBERS

BACKGROUND OF THE INVENTION

Problems incurred in the mounting and operation of gates. These problems may relate to the mounting of the gate on a post as well as connecting the adjacent ends of a double gate structure. Misalignment problems can occur due to a wide number of circumstances such as the mounting post not being perfectly vertical. Mounting and connecting problems can also occur with other devices having similar operational characteristics.

Representative gate connectors are shown in U.S. Pat. Nos. 404,391, Jun. 4, 1889; U.S. Pat. No. 3,857,593, Dec. 31, 1974; and U.S. Pat. No. 4,790,578, Dec. 13, 1988. None of these devices, however, take into consideration the problems associated with misalignment of the two gates being connected nor are the connectors adapted for use in more than one specific situation. What is needed is a universal connector that is adaptable for connecting the gate to a post for swinging between open and closed positions and for alternatively connecting adjacent ends of a double gate structure regardless of misalignment problems that may exist.

SUMMARY OF THE INVENTION

The connector of this invention is simple in design and construction in the fact that it involves essentially two components of identical shape. A U-shaped yoke is formed from a piece of flat metal to include a pair of spaced apart yoke legs interconnected by a base portion. The two base portions are rotatably interconnected by a pin. A removable closure pin interconnects the free ends of the yoke legs to hold in place a frame member of a gate or the like.

Alternatively, one of the plate members forming the yoke is adapted to function as a base mounting plate for connecting the yoke rotatably connected thereto, to a stationary support such as a post-to which a gate may be mounted for swingable movement between open and closed positions.

A minimum of component parts are required since the only difference between the two basic connectors of this invention is in the fact that one additional step is taken to make the connector having two yokes. That step is to bend the outer free ends of one of the plates into parallel positions thereby providing two yokes in back to back relationship.

DESCRIPTION OF THE DRAWINGS

FIG. 1 is an elevational view of a double gate utilizing the gate bracket connector in several different positions.

FIG. 2 is an enlarged fragmentary perspective view of the gate bracket connector as shown by the line 2—2 in FIG. 1.

FIG. 3 is a perspective view of the gate bracket connector illustrating alternate steps of construction.

FIG. 4 is a fragmentary perspective view of the gate bracket connector interconnecting the upper corners of double gates wherein the gates are in overlapping relationship.

FIG. 5 is a fragmentary elevational view of double gates being interconnected wherein one gate is vertically misaligned relative to the other gate.

FIG. 6 is a cross-sectional view taken along line 6—6 in FIG. 5.

FIG. 7 is a view similar to FIG. 1 but showing the post on which the gate is mounted at an angle to the vertical.

FIG. 8 is a cross-sectional view taken along line 8—8 in FIG. 7.

FIG. 9 is a fragmentary perspective view of the gate bracket connector including one yoke rotatably connected to a base plate in turn mounted on a post.

FIG. 10 is a front elevational view of the connector of FIG. 9 showing the yoke rotated relative to the face plate.

DESCRIPTION OF PREFERRED INVENTION

The gate bracket connector of this invention is referred to generally in FIG. 1 by the reference numeral 10 and is shown interconnecting the adjacent ends of a double gate structure 12 including individual gates 14 and 16.

The gates 14 and 16 are conventional in their design and include a peripheral frame having top and bottom horizontal portions 18 and 20 and opposite vertical portions 22 and 24 interconnected by a center portion 26. The gates are mounted on a post 28.

The gate bracket connector 10 includes a pair of back to back U-shaped yokes 30 and 32 rotatably interconnected by a pin 34 interconnecting the respective base portions 36. The yokes each include a pair of spaced apart legs 38 and 40 adapted to receive a gate frame portion such as vertical portion 22 as seen in FIG. 2. A removable lock closure fastener 42 of conventional design extends between the legs 38 and 40 through a pair of aligned openings 44 having variable spacing from the base portion 36 thereby allowing for different size gate members to be locked in the yokes 30 and 32.

The ability of the gate bracket connector 10 to adapt to varying misalignment problems is illustrated in FIGS. 4-6. In FIG. 4 the gates 14 and 16 overlap at their free end portions and the two yokes 30 and 32 engage the gate frames at their upper corners with one yoke being rotated relative to the other yoke causing the yokes fit rounded corners. In FIG. 5 the gates 14 and 16 ar positioned such that the gate 14 is angled down at its free end causing the substantially vertical outer free frame member 22 to be misaligned with the vertical frame member 22 of the gate 16. Nevertheless, the yokes 30 and 32 ma be rotated relative to each other such that they still embrace the vertical frame members 22 of the double gate structure 12. As seen in FIG. 6 the gates 14 and 16 are also in different vertical planes and overlap slightly at their free ends.

In FIGS. 7-10, a variation 10A of the double yoke connector 10 is illustrated. The connector 10A differs only in the fact that yoke 30 is rotatably connected to a plate 32A which is flat in shape as contrasted with the double yoke version where the plate is bent at its free ends as seen in FIG. 3 to form the second yoke 32. The flat plate 32A is fastened to a gate post 28 by screws 50 extending through the removable closure pin hole 44. In FIG. 7 the connector 10A is shown mounted on the member 26 of gate 14 and to the vertical member 24 of gate 16. The connector 10A for gate 16 is seen rotated to a position suitable for connecting the gate 16 to a leaning post 28.

In FIG. 8, top and bottom connectors 10A are shown for illustrative purposes connected to the leaning post 28. In FIG. 10 the yoke 30 is seen rotated relative to the plate 32A.

Thus it is seen that the gate bracket connectors 10 and 10A are very forgiving, allowing for being adapted to a wide variety of situations having misalignment problems. The connectors 10 and 10A are easily and inexpensively constructed utilizing the same materials and differ only by one bending operational step wherein the flat plate 32A of the connector 10A has its free ends bent to parallel positions to form the second yoke 32 of the connector 10. It is apparent that the advantages of this universal connector may be utilized in connecting together items other than gates.

What is claimed is:

1. A bracket connector for a double gate structure including a pair of gates movable to and from closed positions wherein said gates are located substantially in a common plane with vertical outer end members of the gates adjacent one another, comprising;
   a pair of U-shaped yoke members having base portions interconnecting spaced apart legs, said U-shaped yoke members being formed from rigid one piece plates and the outer ends of the yoke members including aligned openings to receive a removable closure pin,
   pin means interconnecting said base portions positioned in adjacent relationship with said yoke members being positioned in back to back relationship whereby said yoke members are rotatable, each pair of spaced apart legs extending in opposite directions along a common axis which is parallel to the axis of said pin means, and said yoke members adapted to straddle the adjacent vertical outer end members of the gates as said yoke members are rotated relative to each other for alignment with the adjacent vertical outer end members of the gates.

2. The structure of claim 1 wherein a pin extends through the aligned openings in the outer free ends of the legs of each of said yokes.

3. The structure of claim 1 wherein said aligned openings are a pair among a plurality of pairs of aligned openings unequally spaced from said base portions.

4. A bracket in combination with a first and second gate, each of said gates having a pivot end and a free end, said free ends having vertical outer end members, and said gates being movable to and from closed positions in free end to free end relationship in a common vertical plane, said bracket comprising,
   a pair of U-shaped yoke members having base portions interconnecting spaced apart legs, said U-shaped yoke members being formed from rigid one piece plates and the outer ends of the yoke members including aligned openings to receive a removable closure pin,
   pin means interconnecting said base portions positioned in adjacent relationship with said yoke members being positioned in back to back relationship whereby said yoke members are rotatable, each pair of spaced apart legs extending in opposite directions along a common axis which is parallel to the axis of said pin means, and said yoke members straddling the adjacent vertical outer end members of the gates when said yoke members are rotated relative to each other to be in alignment with the adjacent vertical outer end members of the gates.

5. The structure of claim 4 wherein a pin extends through the aligned openings in the outer free ends of the legs of each of said yokes.

6. The structure of claim 4 wherein said aligned openings are a pair among a plurality of pairs of aligned openings unequally spaced from said base portion.

* * * * *